United States Patent [19]

Tuller et al.

[11] 4,302,511

[45] Nov. 24, 1981

[54] POLYAMIDE LAMINATES CONTAINING COPPER SALTS

[75] Inventors: Harold W. Tuller, Long Valley; Stephen R. Schulze, West Caldwell; Charles D. Mason, Chatham Township, Morris County, all of N.J.

[73] Assignee: Allied Corporation, Morris Township, Morris County, N.J.

[21] Appl. No.: 221,141

[22] Filed: Dec. 29, 1980

[51] Int. Cl.$^3$ .............................................. B32B 27/36
[52] U.S. Cl. ..................................... 428/412; 428/35; 428/474.4; 428/475.2; 428/475.8; 428/523; 428/476.1; 428/480; 428/483; 428/476.3; 428/476.9; 428/477.7
[58] Field of Search ................. 428/475.8, 476.1, 523, 428/35, 475.2, 474.4, 477.7, 476.3, 476.9, 412, 696, 699, 701, 702, 480, 483; 260/45.75 C

[56] References Cited

U.S. PATENT DOCUMENTS

| | | | |
|---|---|---|---|
| 3,264,272 | 8/1966 | Rees | 428/461 |
| 3,355,319 | 11/1967 | Rees | 428/497 |
| 3,527,731 | 9/1970 | Champ | 260/45.75 C |
| 3,845,163 | 10/1974 | Murch | 260/45.75 C |
| 3,873,643 | 3/1975 | Wu | 525/301 |
| 3,882,194 | 5/1975 | Krebaum | 525/301 |
| 4,215,176 | 7/1980 | Tuller | 428/412 |

*Primary Examiner*—Ellis P. Robinson
*Attorney, Agent, or Firm*—Richard A. Negin

[57] ABSTRACT

A laminate structure having at least one layer of a polyamide containing from 0.001 to 1.0 parts, based on the weight of the polyamide, of a copper cation containing material. The polyamide layer is contiguous to at least one opposing layer. The opposing layer contains an effective amount of functional groups selected from the group consisting of acid groups, metal salts of the acid, acid anhydrides, carbonates and mixtures thereof.

58 Claims, No Drawings

POLYAMIDE LAMINATES CONTAINING COPPER SALTS

DESCRIPTION

Background of the Invention

1. Field of the Invention

This invention relates to multi-layered laminated structures comprised of at least one layer of a polyamide containing a copper cation containing material, the layer being contiguous to another layer containing at least one polymer having pendent carboxylic acid groups, carboxylate salts, carboxylic acid anhydrides, carbonates or mixtures thereof.

2. Description of the Prior Art

Laminates of polyamides with acid or anhydride-containing alkylenic polymers are known in the art. These laminate structures, either in the form of films or sheets, can be fabricated into products such as food packaging, bottles, gasoline tanks, and the like. Such laminates offer both the advantages of polyamides such as strength, abrasion resistance, low friction, heat resistance, and low gas permeability as well as the cost advantage and low water permeability of alkylene polymers.

Although these polyamide/alkylenic-polymer laminates offer the aforementioned advantages, insufficient adhesion between the polyamide layer and the alkylenic polymer layer reduces their strength and usefulness. This adhesion can be particularly low under certain conditons such as high moisture levels or cold temperatures.

U.S. Pat. No. 4,215,176 discloses a multilayered laminate having at least one layer of a polyamide such as polyepsiloncaprolactam containing an excess of terminal amine groups and at least one layer, opposing the polyamide layer, containing a polymer having pendent carboxylic acid groups, their salts, carbonates, or acid anhydrides.

SUMMARY OF THE INVENTION

In accordance with the present invention, there is provided a multi-layered laminated structure comprised of at least one layer of a polyamide bonded to at least one opposing polymeric layer, wherein the polyamide contains from 0.001 to 1.00 parts based on the weight of the polyamide of a copper cation containing material, and the opposing polymeric layer contains an effective amount of functional groups selected from the group consisting of acid groups, metal salts of said acids wherein the metal is selected from Groups I, II, III, VI-A and VII of the Periodic Table of the Elements, acid anhydrides, carbonates or mixtures thereof. Preferably, the polyamide contains amine and acid terminal groups, with an excess of amine terminated groups.

In a more preferred embodiment in accordance with the present invention there is provided a multi-layered laminated structure comprised of at least one layer of polyepsiloncaprolactam containing a copper cation containing material which is selected from the group consisting of: copper halides, copper sulfate, copper acetate, and the copper salts of ethylene acrylic acid copolymer, and ethylene methacrylic acid copolymer. Preferably, the polyepsiloncaprolactam contains 60 to 97 mol percent of its end groups as amine end groups. The at least one opposing layer of an interpolymer is comprised of units derived from ethylene and a comonomer selected from the group consisting of acrylic acid, methacrylic acid, and maleic anhydride.

Preferably, the opposing polymeric layer is comprised of an alkylenic interpolymer formed by the polymerization of olefinic monomers containing such groups, the copolymerization of said olefinic monomers with other monomers, or the grafting of polymers or monomers, containing such groups, with alkylenic polymers. The salts of carboxylic acids suitable for use herein are preferably formed subsequent to the polymerization or copolymerization of the acid-containing monomers.

Laminates of the present invention are characterized by superior adhesion of the polyamide layer to the alkylenic interpolymer layer such that the layers will not separate under adverse conditions, such as relatively high moisture levels and/or relatively cold temperatures.

DETAILED DESCRIPTION

Polyamides suitable for use as the polyamide layer of the laminate of the present invention include the long chain polymeric amides having recurring amide groups as part of the polymer backbone and preferably having a number average molecular weight, as measured by membrane osmometry, of about 15,000 to 40,000 and, preferably, containing at least 1.5 times as many amine groups as acid groups. Preferred polyamides include polyepsiloncaprolactam and polyhexamethylene adipamide.

Particularly preferred are polyamides prepared by the polymerization of epsiloncaprolactam in the presence of a comonomer containing two or more amine groups per molecule, such as hexamethylene diamine.

Other lesser preferred examples of such polyamides are: (a) those prepared by the condensation of a diamine with a dibasic acid in the presence of an excess amount of diamine or a multifunctional amine compound containing at least three amino groups per molecule, with the diamine preferably being hexamethylene diamine and the dibasic acid being adipic acid or sebasic acid; (b) random interpolymers of the above monomer groups having an excess amount of diamine or other multifunctional amine compound; and (c) blends or block interpolymers comprising two or more of these polyamides, at least one of which is prepared with a surplus of polyfunctional amine as herein described. Preferred are those polyamides based on the polymerization of epsiloncaprolactam and those based on a diamine and a diacid; more preferred are those based on epsiloncaprolactam.

The polyamide can be produced by any conventional process known in art. Illustrative of one such process which is suitable for producing polyepsiloncaprolactam involves two steps. The first step consists of heating epsiloncaprolactam and a hexamethylene diamine and water to a temperature of from about 180° to 300° C. under super-atmospheric pressure (about 200 to 280 lbs/in$^2$) to effect partial polymerization. The water is allowed to distill gradually from the reaction mixture while the polymerization continues after most of the monomer has been converted to a low molecular weight polymer. The pressure is reduced to atmospheric pressure wherein the second step is commenced, which comprises completing the polymerization by heating at atmospheric pressure in the range of about 180° to 300° C.

Other lesser preferred examples of diamines suitable for use herein include tetramethylene diamine, pentamethylene diamine, octamethylene diamine and decamethylene diamine. The amount of diamine needed to produce the high diamine-containing polyamides of the present invention varies depending on the amount of amine desired and the molecular weight of the resulting polymer, and can be easily determined by one skilled in the art. For example, about 0.25 mol percent of hexamethylene diamine is required to produce a polyepsilon-caprolactam of about 21,000 number average molecular weight having about 80 equivalents of amine end groups per $10^6$ gm polyamide and about 17 equivalents acid end groups per $10^6$ gm polyamide. Generally, the amount of amine end groups required in the polyamide, in order to give improved adhesion to the alkylenic interpolymers, is at least 1.5 times the amount of acid end groups, preferably at least 2 times, more preferably at least 3 times, and most preferably at least 4 times.

It is preferred that the polyamide used herein have a maximum amount of amine functionality. The maximum amount of amine functionality is dependent on the number average molecular weight of the polyamide and can be easily calculated by use of the following formula:

$$R = \frac{\frac{10^6}{m} + \sqrt{\frac{10^{12}}{m^2} - 450}}{\frac{10^6}{m} - \sqrt{\frac{10^{12}}{m^2} - 450}}$$

where R is the maximum practical ratio of amine to acid functionality and m is the number average molecular weight. For example, for a polyepsiloncaprolactam having a number average molecular weight of 40,000, the maximum ratio of amine to acid functionality in the polyamide would be about 3.2 to 1, and for a number average molecular weight of 17,000, the maximum ratio of amine to acid would be about 29 to 1.

The polyamide of the polyamide layer contains from 0.001 to 1.0 parts, and preferably 0.005 to 0.4 parts, based on the weight of the polyamide, of a copper cation containing material. Copper cation containing materials useful for the present invention include cupric or cuprous cations of corresponding inorganic, organic or polymeric anions and mixtures thereof, as well as copper complexes.

Representative copper cation containing materials include copper: acetate, acetoarsenite, ammonium chloride, ammonium iodide, ammonium sulfate, arsenate, arsenide, arsenite, benzoate, borate, boride, bromate, bromide, butyrate, carbonate, chlorate, chloride, chromate, dichromate, citrate, cyanide, ethyl acetoacetate, ferricyanide, ferrocyanide, fluogallate, fluoride, fluosilicate, formate, glycerine derivative $(Cu(C_2H_4NO_2))$·$H_2O$, hydride, hydroxide, iodate, iodide, lactate, laurate, malonate, nitrate, nitride, nitrite, nitroprusside, oxalate, oxide, oxychloride, palmitate, 2,4-pentanedione derivative $(Cu(C_5H_7O_2)_2)$, periodate, phosphate, phosphide, propionate, salicylate, selenate, selenide, silicide, stearate, sulfate, sulfide, sulfite, tartrate, tellurite, thiocyanate, tungstate, and xanthate. Additional copper complexes include: diamminecopper(II)acetate; tetramminecopper(II)sulfate; tetrapyridinecopper(II)fluosilicate; and tetrapyridinecopper(II)perrhenate.

Preferred inorganic copper cation containing materials are copper halides and copper sulfate. The preferred copper halides are cupric chloride, cuprous chloride and cuprous iodide, with cuprous iodide most preferred. A preferred organic copper cation containing material includes copper acetate, and preferred polymeric copper cation containing materials include the copper salts of ethylene acrylic acid copolymer and ethylene methacrylic acid copolymer.

Preferably, the polyamide contains 0.005 to 0.4 parts, based on the weight of the polyamide, of the copper containing material. The most preferred copper cation containing material is cuprous iodide. The copper cation containing material should be uniformly dispersed within the polyamide. The copper cation containing material can be added during polymerization of the polyamide, or blended subsequently. The copper cation containing material can be melt blended with the polyamide in an internal mixer or an extruder. It can be added to the polyamide in the melt prior to being extruded into a film. Preferably, the copper cation containing material is added in powder form at the end of the polymerization. It is preferred to use a very fine powder for better film appearance.

Alkylenic interpolymers suitable for use in the opposing layers in the present invention are those polymers which may contain, as a major comonomer, substituted as well as unsubstituted ethylenically unsaturated compounds represented by the formula

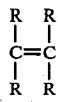

wherein each R can be independently hydrogen, or at least one R on one carbon can be a substituted or unsubstituted alkyl or aryl radical of up to 8 carbon atoms. Non-limiting examples of such monomers include heptene-1, decene-1, styrene ethylene, propylene, butene, cyclopentene and cyclohexene. Halogenated materials such as tetrafluoroethylene; conjugated dienes, such as butadiene-1,3, 2-chlorobutadiene-1,3 (chloroprene), and 2,3-dimethylbutadiene-1,3; etc., can also be satisfactorily employed.

Other comonomers present in minor amounts which are suitable for use in the present invention are $C_3$ to $C_9$ carboxylic acid-containing comonomers. Illustrative of such carboxylic acid-containing comonomers include the monocarboxylic acids represented by the formula

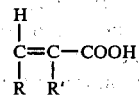

where R' can be hydrogen or a $C_1$ to $C_6$ alkyl group, and R can be hydrogen or fluorine. Non-limiting examples of such carboxylic acids include acrylic acid, methacrylic acid, 2-ethylacrylic acid, crotonic acid, and 2-butylacrylic acid; preferred are acrylic acid and methacrylic acid.

Also suitable for use are carboxylic acid containing olefins such as 3-butenoic acid, 3-hexenoic acid, maleic acid and the like.

Also suitable for use as the copolymer in minor amounts are anhydride-containing monomers, preferably maleic anhydride. Preferred interpolymers containing anhydrides are styrene-maleic anhydride copolymers and ethylene-maleic anhydride copolymers containing up to about 50 mol percent of units derived from maleic anhydride.

Also suitable for use in the present invention, as the minor comonomer, are metal salts of the aforementioned carboxylic acids wherein the metal is one or more mono-, di-, or trivalent metal of Groups I, II, III, IV-A and VII of the Periodic Table of the Elements. Polymers wherein the metals are of Group I and II and especially $Na^+$, $K^+$, and $Zn^{++}$ are preferred; most preferred is $Zn^{++}$. It will be appreciated by those skilled in the art that where the composite is to be utilized in the packaging of foods, the metal selected is preferably non-toxic. The carboxylate salt of the acids are preferably formed by the reaction of the finished polymer with metal bases. These compositions are more fully set forth in U.S. Pat. No. 3,264,272, incorporated herein by reference.

The alkylenic acid interpolymers may be prepared by methods well known in the art including those disclosed in U.S. Pat. Nos. 3,355,319 and 3,264,272, wherein the interpolymers are obtained by the copolymerization of a mixture of the olefin and the carboxylic acid monomer. It is preferred that the acid-containing polymers employed herein have a high polarity as indicated by wetting measurements, i.e., they should be capable of being wetted by inert solvents having surface tensions of 37 dynes per centimeter or greater.

The preferred acid-containing interpolymers herein are ethyleneacrylic acid or ethylenemethacrylic acid copolymers containing at least 50 mol percent ethylene wherein a portion of the acid groups may have been converted to salts of $Na^+$, $K^+$, or $Zn^{++}$.

The acid and acid anhydride-containing interpolymers herein may also be prepared by the grafting reaction of polymerizable cyclic ethylenically unsaturated carboxylic acids or acid anhydrides with alkylenic homopolymers or interpolymers. Non-limiting examples of such alkylenic polymers which may be reacted with such acids and acid anhydrides include polyethylene, copolymers of ethylene and butadiene, polypropylene, and copolymers of ethylene and vinyl acetate. Non-limiting examples of such acids and acid anhydrides include maleic anhydride, 4-methylcyclohex-4-ene-1,2-dicarboxylic acid anhydrides, tetrahydrophthalic anhydride, methylnorborn-5-ene-2,3-dicarboxylic anhydride, norborn-5-ene-2,3-dicarboxylic anhydride, 2-cyclopentenylacetic acid, abietic acid, maleo-primaric acid, and bicyclo[2,2,2]oct-5-ene-2,3-dicarboxylic anhydride.

These graft polymers can be prepared according to any of the conventional methods known in the art, some of which are disclosed in U.S. Pat. Nos. 3,873,643 and 3,882,194.

The opposing layers of the subject composites may also include blends of two or more polymers, at least one of which contains the acid, acid salt, acid anhydride, or carbonate functionality as herein described.

The concentration of acid, acid salt, and/or anhydride functionality of the alkylenic interpolymer need only be present in an effective amount. By an effective amount we mean that amount which will give improved adhesion to a conventional polyamide, such as polycaprolactam, having amine terminal functionality on one end of the molecule and acid functionality on the other end. Of course, in accordance with the present invention, when a polyamide containing an excess of amine terminal functionality is used in place of the conventional polyamide, the adhesion is substantially further improved.

Generally, the mol percent of acid functionality can be as low as about 0.1 mol percent or as high as 50 mol percent, preferably about 0.5 to 25 mol percent, more preferably about 1 to 10 mole percent. Also, the mol percent of anhydride functionality can be about 0.05 mol percent to 50 mol percent, preferably about 0.2 mol percent to 25 mol percent.

The polyamide layers can contain or be blended with up to about 25 weight percent of another polymeric material, preferably up to 10 weight percent, and more preferably up to 5 weight percent. When the other polymeric material is that of the opposing layer, up to 50 weight percent of such material can be blended into the polymide layer.

It will be noted that the other polymeric materials which can be blended into the composites of the present invention can be recycled scrap resulting from the production of the composites herein or from other composite structures as long as the aforementioned requirements as to functional groups are met. When the scrap used is obtained solely from the manufacture of the composites of the present invention, it can be recycled in such a way that it is used as part of or in place of one or more of the layers of the composite, such that a polyamide layer blended with said scrap can contain up to 50 weight percent non-polyamide material and the opposing layer can contain up to 50 weight percent polyamide.

It will also be noted that condensation polymers can also be used for the opposing layers in the composites of the present invention. Preferred condensation polymers include polyesters and polycarbonates, more preferably poly(ethylene terephthalate), poly(butyleneterephthalate), and the polycarbonates of bisphenol-A. These condensation polymers also preferably contain pendent functionality selected from the group consisting of carboxylic acids, metal salts of said acids wherein the metal is selected from Groups I, II, III, IV-A and VII of the Periodic Table of the Elements, acid anhydrides or mixtures thereof.

It should be noted that polyesters and polycarbonate resin need not contain the above pendent functional groups before procesing, owing to the fact that during melt blending, such polymers undergo hydrolytic degradation leading to the formation of functional groups such as carboxylic acid or carbonate.

The laminated structures of the present invention can be prepared by any conventional method generally known in the art. Non-limiting examples of such methods include blown film coextrusion, cast film coextrusion, coating extrusion, coextrusion blow molding, thermal lamination, multi-component injection molding, and layered rotational molding.

In film or sheet extrusion, the polyamide layer and interpolymer layer are each extruded from separate extruders and subsequently laminated together at elevated temperatures by passage through a common die, or adjacent dies.

Extrusion coating, for purposes of the present invention, is the extrusion of a film or sheet of the alkylenic interpolymer onto a prefabricated film or sheet of polyamide or vice versa.

Rotational molding as used herein includes the procedure wherein both the polyamide and the alkylenic interpolymer are rotatably blended in a rotational mold. In a typical rotational molding process, the polyamide is introduced into the mold and the mold is heated while rotating. The alkylenic interpolymer is then fed into the mold. The temperature in the mold is greater than the melting point of the highest melting material, but below the degradation temperatures of either of the materials. The mixture is then rotated for a time sufficient to achieve good distribution of material on the inner wall of the mold. The mold is then cooled while rotating to solidify the materials. Also included is rotation molding of the polyamide and the alkylenic interpolymer by the method of U.S. Pat. No. 3,542,912. In this method, the polyamide is disposed innermost of the molded article.

The compositions of the invention may be modified by one or more conventional additives, such as stabilizers and inhibitors of oxidative, thermal, and ultraviolet light degradation, lubricants and mold release agents, colorants including dyes and pigments, fibrous and particulate fillers and reinforcements, nucleating agents, plasticizers, etc.

The examples which follow illustrate the invention and set forth the best mode which we have contemplated for carrying out the invention, but are intended as illustrative only and not as limiting.

EXAMPLES 1–7

Various single layer films of polyepsiloncaprolactam and the zinc salt of an ethylene/methacrylic acid copolymer, as set forth in Table I below, were prepared. The thickness of the layers was between 3½ and 4 mils and they were prepared by using a 1¼ inch extruder equipped with a 6 inch wide film die and a double roll casting take-up. The extruder and die temperatures were controlled to 260° C. (500° F.) and the casting rolls at about 79.5° C. (175° F.).

The polyepsiloncaprolactam used has the indicated amine to acid termination ratios. The copper containing materials were copper salts listed in Table I. The copper salts were powders which were physically blended with the polyepsiloncaprolactam prior to extrusion. The amounts of copper salts are parts based on the weight of the polyepsiloncaprolactam.

The zinc salt, of the ethylene/methacrylic acid copolymer layer used was Surlyn ™ 1650 available from the Du Pont Company. It has a melt flow index of 1.5 decigrams/minute and a specific gravity of 0.950.

The polyepsiloncaprolactam and alkylenic films were produced separately. The polyepsiloncaprolactam film was vacuum dried at 83° C. for about 2½ hours and both films were cut into strips 1½ inches wide and 5 inches long. A layer of polyepsiloncaprolactam film and a layer of polyolefin film were sandwiched between 1 mil thick aluminum film and heat sealed for 2.5 seconds at a pressure of 25 psi using a standard bag sealer equipped with 1 inch platens controlled at a temperature of 243.3° C. (470° F.).

The aluminum film was removed from only the polyepsiloncaprolactam side and the laminates were immersed in water for 3 hours after which they were tested for peel strength at 5 inches/minute in an Instron testing machine. The resulting peel strengths are shown in Table I below and represent the force required to separate the polyepsiloncaprolactam layer from the polyolefin layer.

TABLE I

| | Amine/Acid | Copper Salt | Peel Strength lbs/1" wide strip |
|---|---|---|---|
| Comp. 1 | 1.00 | — | 0.75 |
| Ex. 1 | 1.00 | .020 $CuCl_2$ | 5.80 |
| Ex. 2 | 1.00 | .020 $CuCl_2 \times 2\ H_2O$ | 5.70 |
| Ex. 3 | 1.00 | .020 $CuSO_4$ | 7.20 |
| Ex. 4 | 1.00 | .020 $Cu_2I_2$ | 7.50 |
| Ex. 5 | 1.00 | .020 $Cu(C_2H_3O_2)_2 \cdot H_2O$ | 3.75 |
| Comp. 2 | 4.33 | — | 5.30 |
| Ex. 6 | 4.33 | .010 $Cu_2I_2$ | 13.20 |
| Ex. 7 | 4.33 | .020 $Cu_2I_2$ | Inseparable |

The above table shows that the addition of a copper salt to the polycaprolactam layer results in increased adhesion of the polyepsiloncaprolactam layer to the Surlyn 1650 layer. Increased adhesion resulted for polyepsiloncaprolactam having an equal number of amine and acid terminal groups or an excess number of amine groups. Further, there is greater adhesion between a layer of the zinc salt of methacrylic acid copolymer and a polyamide containing a copper salt having an excess of amine terminal groups, than the polyamide containing no copper salt and having an excess of amine terminal groups.

EXAMPLES 8, 9

Two layer laminates were prepared according to the procedure of Examples 1–7, except that the laminates were heat sealed for 1.5 seconds at 226.7° C. (440° F.) and 243.3° C. (470° F.). Polyepsiloncaprolactam layers having the amine to acid ratios shown in Table II were laminated to film of ethylene vinyl acetate copolymer containing grafted anhydride groups and available from the Chemplex Co. as Plexar ™ I. Peel strength measurements were made according to the procedure of Examples 1–7.

TABLE II

| | | | Peel Strength lbs/1" wide strip | |
|---|---|---|---|---|
| | Amine/Acid | Copper Salt | 1½ sec @ 226.7° C. | 1½ sec @ 243.3° C. |
| Comp. 3 | 1.00 | — | .50–7.5* | 8.6 |
| Ex. 8 | 1.00 | 0.020 $Cu_2I_2$ | 6.5 | 10.0 |
| Comp. 4 | 4.33 | — | 3.0–8.0* | 10.6 |
| Ex. 9 | 4.33 | 0.020 $Cu_2I_2$ | 10.5 | 15.2 |

*inconsistent values for various peel samples

The results in Table II show the improvement in laminate adhesion of a laminate of a layer of ethylene vinyl acetate copolymer containing grafted anhydride groups and a layer of polyepsiloncaprolactam having equal amine and acid terminal groups, or excess amine terminal groups when the polyepsiloncaprolactam contains a copper salt.

It is to be understood that variations and modifications of the present invention may be made without department from the scope of the invention. It is also to be understood that the scope of the invention is not to be interpreted as limited to the specific embodiment disclosed herein but only in accordance with the appended claims when read in light of the foregoing disclosure.

What is claimed is:

1. A laminate structure comprised of:
   at least one layer of a polyamide containing from 0.001 to 1.0 parts, based on the weight of the polyamide, of a copper cation containing material;

at least one layer of an interpolymer comprised of units derived from ethylene and a comonomer selected from the group consisting of acrylic acid, methacrylic acid, and maleic anhydride; and wherein at least one polyamide layer is contiguous to at least one interpolymer layer.

2. The laminate structure of claim 1 wherein the polyamide is polyepsiloncaprolactam or an interpolymer thereof.

3. The laminate structure of claim 1 wherein the interpolymer is a metal salt of an ethylene acrylic acid copolymer or an ethylene methacrylic acid copolymer and wherein the metal is selected from the group consisting of Na+, K+, and Zn++.

4. The laminate structure of claim 1 wherein the interpolymer contains acid anhydride.

5. The laminate as recited in claims 1 or 2 wherein the copper cation containing material is selected from the group consisting of copper halides, copper sulfate, copper acetate, and the copper salts of ethylene methacrylic acid copolymer, and ethylene acrylic acid copolymer.

6. The laminate as recited in claim 5 wherein the copper cation containing material is selected from the group of cupric chloride, cuprous chloride, copper sulfate, copper acetate and cuprous iodide.

7. The laminate as recited in claim 5 wherein there is from 0.005 to 0.4 parts, based on the weight of the polyamide, of the copper cation containing material.

8. The laminate structure as recited in claim 1 wherein the at least one layer of the polyamide has about 60 to 97 mol percent of its end groups as amine end groups.

9. The laminate structure as recited in claim 8 wherein there is from 0.005 to 0.4 parts, based on the weight of the polyamide, of cuprous iodide.

10. The laminate structure as recited in claim 8 wherein the polyamide is polyepsiloncaprolactam or an interpolymer thereof.

11. A laminate structure comprised of:
at least one layer of a polyamide containing from 0.001 to 1.0 parts, based on the weight of the polyamide, of a copper cation containing material;
at least one layer of an alkylenic interpolymer containing functional groups selected from the group consisting of acid groups, metal salts of said acids wherein the metal is selected from Groups I, II, III, IV-A and VII of the Periodic Table of the Elements, acid anhydrides, or mixtures thereof; and
wherein at least one polyamide layer is bonded to at least one alkylenic interpolymer layer.

12. The laminate as recited in claim 11 wherein the polyamide contains amine and acid terminal groups, wherein at least 1.5 times as many amine end groups then acid groups are present.

13. The laminate as recited in claims 11 or 12 wherein the copper cation containing material is selected from the group consisting of copper halides, copper sulfate, copper acetate, and the copper salts of ethylene acrylic acid copolymer, and ethylene methacrylic acid copolymer.

14. The laminate as recited in claim 13 wherein the copper cation containing material is selected from the group consisting of cupric chloride, cuprous chloride, copper sulfate, copper acetate and cuprous iodide.

15. The laminate as recited in claim 14 wherein there is from 0.005 to 0.4 parts, based on the weight of the polyamide, of the copper cation containing material.

16. The laminate structure of claim 11 wherein more than 3 times as many amine end groups are present than acid end groups.

17. The laminate structure of claim 16 wherein the polyamide is polyepsiloncaprolactam or an interpolymer thereof.

18. The laminate structure of claim 11 wherein the polyamide is comprised of units derived from hexamethylene diamine and adipic acid.

19. The laminate structure of claim 11 wherein the alkylenic interpolymer is a copolymer comprised of (a) at least 50 mol percent of units derived from an ethylenically unsaturated monomer represented by the formula

wherein R can be independently hydrogen, or at least one R on one carbon can be a substituted or unsubstituted alkyl or aryl radical of up to 8 carbon atoms, and (b) up to 50 mol percent of units derived from a $C_3$ to $C_9$ carboxylic acid-containing monomer represented by the formula

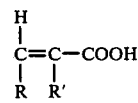

where R' is hydrogen or a $C_1$ to $C_6$ alkyl group, and R is hydrogen or fluorine.

20. The laminate structure of claim 19 wherein the ethylenically unsaturated monomer is selected from the group consisting of ethylene, propylene and styrene.

21. The laminate structure of claim 19 wherein the carboxylic acid-containing monomer is selected from the group consisting of acrylic acid, methacrylic acid, maleic acid, 2-ethylacrylic acid, crotonic acid, and 2-butylacrylic acid.

22. The laminate structure of claim 21 wherein the carboxylic acid is acrylic acid or methacrylic acid.

23. The laminate structure of claim 11 wherein the alkylenic interpolymer contains acid anhydride.

24. The laminate structure of claim 11 wherein the metal is selected from the group consisting of Na+, K+, and Zn++.

25. The laminated structure of claim 24 wherein the metal is Zn++.

26. The laminate structure as recited in claim 24 wherein there is from 0.05 to 0.4 parts, based on the weight of the polyamide, of cuprous iodide.

27. A laminate structure comprised of:
at least one layer of polyamide containing from 0.001 to 1.0 parts, based on the weight of the polyamide, of a copper cation containing material;
at least one layer of a graft polymer comprised of an alkylenic interpolymer having olefinic acid anhydride grafted thereto;
wherein at least one polyamide layer is contiguous to at least one graft polymer layer.

28. The laminate as recited in claim 27 wherein the polyamide contains amine and acid terminal groups, wherein at least 1.5 times as many amine end groups than acid end groups are present.

29. The laminate as recited in claim 27 wherein the copper cation containing material is selected from the group consisting of cupric chloride, cuprous chloride, copper sulfate, copper acetate and cuprous iodide.

30. The laminate as recited in claim 29 wherein there is from 0.005 to 0.4 parts, based on the weight of the polyamide, of the copper cation containing material.

31. The laminate structure of claim 27 wherein the polyamide is polyepsiloncaprolactam.

32. The laminate structure of claim 27 wherein the polyamide is comprised of units derived from hexamethylene diamine and adipic acid.

33. The laminate structure of claim 27 wherein the alkylenic interpolymer is selected from the group consisting of polyethylene, polypropylene and polyethylene-diene copolymers.

34. The laminate structure of claim 27 wherein the alkylenic interpolymer is an ethylene vinyl acetate copolymer.

35. A laminate structure comprised of:
at least one layer of polyamide containing from 0.001 to 1.0 parts, based on the weight of the polyamide, of a copper cation containing material;
at least one layer comprised of one or more condensation polymers other than polyamide and containing pendent functional groups selected from the group consisting of acid groups, metal salts of said acids wherein the metal is selected from Groups I, II, III, IV-A and VII of the Periodic Table of the Elements, acid anhydrides, or mixtures thereof; and
wherein at least one polyamide layer is contiguous to at least one condensation polymer layer.

36. The laminate as recited in claim 35 wherein the polyamide contains amine and acid terminal groups, wherein at least 1.5 times as many amine end groups than acid groups are present.

37. The laminate as recited in claim 35 wherein the copper cation containing material is selected from the group consisting of cupric chloride, cuprous chloride, copper sulfate, copper acetate and cuprous iodide.

38. The laminate as recited in claim 35 wherein there is from 0.005 to 0.4 parts, based on the weight of the polyamide, of the copper cation containing material.

39. The laminate structure of claim 35 wherein the polyamide is polyepsiloncaprolactam or an interpolymer thereof.

40. The laminate structure of claim 35 wherein the polyamide is comprised of units derived from hexamethylene diamine and adipic acid.

41. The laminate structure of claim 35 wherein the condensation polymer contains acid groups partially neutralized with a metal selected from the group consisting of $Na^+$, $K^+$, and $Zn^{++}$.

42. The laminate structure of claim 35 wherein the condensation polymer is selected from the group consisting of polyesters and polycarbonates.

43. The laminate structure of claim 42 wherein the polyester is polyethylene terephthalate or polybutylene terephthalate.

44. The laminate structure of claim 42 wherein the polycarbonate is a polycarbonate of bisphenol-A.

45. A laminate structure comprised of:
at least one layer of polyamide containing from 0.001 to 1.0 parts, based on the weight of the polyamide, of a copper cation containing material;
at least one layer comprised of polyethylene terephthalate or a polycarbonate of bisphenol-A, wherein said polymers have been melt blended to provide pendent functional groups selected from the group consisting of carboxylic acid and carbonate; and
wherein at least one polyamide layer is contiguous to at least one polyethylene terephthalate or polycarbonate layer.

46. The laminate as recited in claim 45 wherein the polyamide contains amine and acid terminal groups, wherein at least 1.5 times as many amine end groups than acid end groups are present.

47. The laminate as recited in claim 45 wherein the copper cation containing material is selected from the group consisting of cupric chloride, cuprous chloride, copper sulfate, copper acetate and cuprous iodide.

48. The laminate as recited in claim 45 wherein there is from 0.005 to 0.4 parts, based on the weight of the polyamide, of the copper cation containing material.

49. The laminate structure of claim 45 wherein the polyamide is polyepsiloncaprolactam or an interpolymer thereof.

50. A laminate structure comprised of:
at least one layer comprised of at least 50 weight percent, based on the total weight of the layer of polyamide, containing from 0.001 to 1.0 parts, based on the weight of the polyamide of a copper cation containing material;
at least one other layer comprised of one or more polymers wherein said layer contains an effective amount of pendent functional groups selected from the group consisting of acid groups, metal salts of said acids wherein the metal is selected from Groups I, II, III, IV-A and VII of the Periodic Table of the Elements, acid anhydrides, and mixtures thereof; and
wherein at least one polyamide containing layer is contiguous to at least one said other layer.

51. The laminate as recited in claim 50 wherein the polyamide contains amine and acid terminal groups, wherein at least 1.5 times as many amine end groups than acid end groups are present.

52. The laminate as recited in claim 50 wherein the copper cation containing material is selected from the group consisting of cupric chloride, ,uprous chloride, copper sulfate, copper acetate and cuprous iodide.

53. The laminate as recited in claim 50 wherein there is from 0.005 to 0.4 parts, based on the weight of the polyamide, of the copper cation containing material.

54. The laminate structure of claim 50 wherein the polyamide is polyepsiloncaprolactam or an interpolymer thereof.

55. The laminate structure of claim 50 wherein at least 75 weight percent polyamide is present.

56. The laminate structure of claim 50 wherein at least 50 weight percent, based on the total weight of said other layer, of alkylenic interpolymer containing an effective amount of acid groups is present in said other layer.

57. The laminate structure of claim 56 wherein the acid groups are partially neutralized with a metal selected from the group consisting of $Na^+$, $K^+$, and $Zn^{++}$.

58. The laminate structure of claim 50 wherein at least 50 weight percent, based on the total weight of said other layer, of a polymer selected from the group consisting of alkylenic interpolymers and condensation polymers containing said functional groups is present in said other layer.

* * * * *

UNITED STATES PATENT AND TRADEMARK OFFICE
CERTIFICATE OF CORRECTION

PATENT NO. : 4,302,511

DATED : November 24, 1981

INVENTOR(S) : Harold W. Tuller, Stephen R. Schulze and Charles D. Mason

It is certified that error appears in the above-identified patent and that said Letters Patent are hereby corrected as shown below:

Column 9, line 55 "then" should be -- than --.

Column 12, line 43 ",uprous" should be -- cuprous --.

Signed and Sealed this

Ninth Day of March 1982

[SEAL]

Attest:

GERALD J. MOSSINGHOFF

*Attesting Officer*     *Commissioner of Patents and Trademarks*